United States Patent
Zhou et al.

(10) Patent No.: US 11,180,165 B2
(45) Date of Patent: Nov. 23, 2021

(54) AUTONOMOUS DRIVING VEHICLE THREE-POINT TURN

(71) Applicant: Baidu USA LLC, Sunnyvale, CA (US)

(72) Inventors: Jinyun Zhou, Sunnyvale, CA (US);
Shu Jiang, Sunnyvale, CA (US);
Jiaming Tao, Sunnyvale, CA (US); Qi Luo, Sunnyvale, CA (US); Jinghao Miao, Sunnyvale, CA (US); Jiangtao Hu, Sunnyvale, CA (US); Jiaxuan Xu, Sunnyvale, CA (US); Yu Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 152 days.

(21) Appl. No.: 16/727,799

(22) Filed: Dec. 26, 2019

(65) Prior Publication Data
US 2021/0197865 A1    Jul. 1, 2021

(51) Int. Cl.
*B60W 30/12*        (2020.01)
*B60S 13/02*        (2006.01)
*G06T 7/215*        (2017.01)
*B60W 60/00*        (2020.01)
(Continued)

(52) U.S. Cl.
CPC ........ *B60W 60/0025* (2020.02); *B60W 30/12* (2013.01); *B60W 30/18009* (2013.01); *G01C 21/3673* (2013.01)

(58) Field of Classification Search
CPC ........... B60W 30/18036; B60W 50/14; B60W 30/0956; B60W 30/18154; B60S 13/02; G06T 7/215; G06T 7/70; G06T 7/11; G05D 1/0088; G05D 1/0289; G08G 1/07; G08G 1/202; G08G 1/166; G01S 13/422; G01C 21/00
See application file for complete search history.

(56) References Cited

U.S. PATENT DOCUMENTS 10,518,755 B1 * 12/2019 Daneshvar .............. B60S 13/02
2011/0121992 A1 * 5/2011 Konaka .................. G08G 1/166
340/905
(Continued)

OTHER PUBLICATIONS

John Leonard et al: A perception-driven autonomous urban vehicle11 , Journal of Field Robotics, vol. 25, No. 10, Oct. 1, 2008 (Oct. 1, 2008), pp. 727-774, XP055179322,ISSN: 1556-4959, DOI: 10.1002/rob.20262 *pp. 728,751 * p. 752 *.
(Continued)

*Primary Examiner* — Yuri Kan
(74) *Attorney, Agent, or Firm* — Womble Bond Dickinson (US) LLP (57) ABSTRACT

In one embodiment, an autonomous driving vehicle (ADV) operates in an on-lane mode, where the ADV follows a path along a vehicle lane. In response to determining that the ADV is approaching a dead-end, the ADV switches to an open-space mode. While in the open-space mode, the ADV conducts a three-point turn using a series of steering and throttle commands to generate forward and reverse movements until the ADV is within a) a threshold heading, and b) a threshold distance, relative to the vehicle lane. The ADV can then return to the on-lane mode and resume along the vehicle lane away from the dead-end.

20 Claims, 9 Drawing Sheets

(51) Int. Cl.
  B60W 30/18 (2012.01)
  G01C 21/36 (2006.01)

(56) References Cited

U.S. PATENT DOCUMENTS

| | | | |
|---|---|---|---|
| 2012/0166072 A1* | 6/2012 | Tamaoki | B60W 30/18154 701/300 |
| 2017/0057496 A1* | 3/2017 | Toyoda | G05D 1/0289 |
| 2018/0082589 A1* | 3/2018 | Park | B60W 30/0956 |
| 2019/0079514 A1* | 3/2019 | Zhu | G01C 21/00 |
| 2019/0095722 A1* | 3/2019 | Kang | G06T 7/215 |
| 2019/0137601 A1* | 5/2019 | Driscoll | G01S 13/422 |
| 2019/0286153 A1* | 9/2019 | Rankawat | G06T 7/11 |
| 2019/0302768 A1* | 10/2019 | Zhang | B60W 50/14 |
| 2019/0347493 A1* | 11/2019 | Chen | G06T 7/70 |
| 2019/0374151 A1* | 12/2019 | Paudel | G05D 1/0088 |
| 2020/0172089 A1* | 6/2020 | Dyer | G08G 1/202 |
| 2021/0103287 A1* | 4/2021 | Shapira | G08G 1/07 |

OTHER PUBLICATIONS

Chang Chun-Wei et al.: "Multi-point turn decision making framework for human-like automated driving", 2017 IEEE 20th International Conference on Intelligent Transportation Systems (ITSC), IEEE, Oct. 16, 2017 (Oct. 16, 2017), pp. 1-6, XP033330488, DOI: 10.1109/ITSC 2017.8317831 [retrieved on Mar. 14, 2018] * p. 3; figures 3-4 *.

Zhang Songy! et al.: "Hybrid A*-based Curvature Continuous Path Planning in Complex Dynamic Environments", 2019 IEEE Intelligent Transportation Systems Conference (ITSC), IEEE, Oct. 27, 2019 (Oct. 27, 2019), pp. 1468-1474, XP033668280, DOI: 10.1109/ITSC.2019.8916953 [retrieved on Nov. 27, 2019] * p. 3 *.

* cited by examiner

AUTONOMOUS DRIVING VEHICLE THREE-POINT TURN

TECHNICAL FIELD

Embodiments of the present disclosure relate generally to operating autonomous vehicles. More particularly, embodiments of the disclosure relate to performing a three-point turn with an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Some roads end and do not provide enough clearance to conduct a full 'u-turn'. While ADV algorithms are directed to planning for an ADV along a route to a destination, systems and algorithms are lacking which address a dead-end scenario. When an ADV reaches such a dead-end, the ADV should be able to navigate out of the dead-end.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A system and process for autonomous vehicle driving can navigate an ADV in an on-lane mode. In this mode, the ADV follows a trajectory along a vehicle driving lane based on the lane configuration associated with the current lane. The lane configuration may be determined based on the lane marking such as lane lines. The trajectory can be determined based on a ADV route, to get from point A to point B. If the ADV determines that it is approaching a dead-end or there is a need to make a U-turn, the ADV can switch to an open-space mode. In open-space mode, the ADV can perform a three-point turn to turn the ADV around and away from the dead-end. The ADV can then switch back to on-lane mode and drive away from the dead-end. Thus, the system and process can navigate the ADV out of a dead-end, even if there is not enough clearance for a U-turn.

Figure 1:
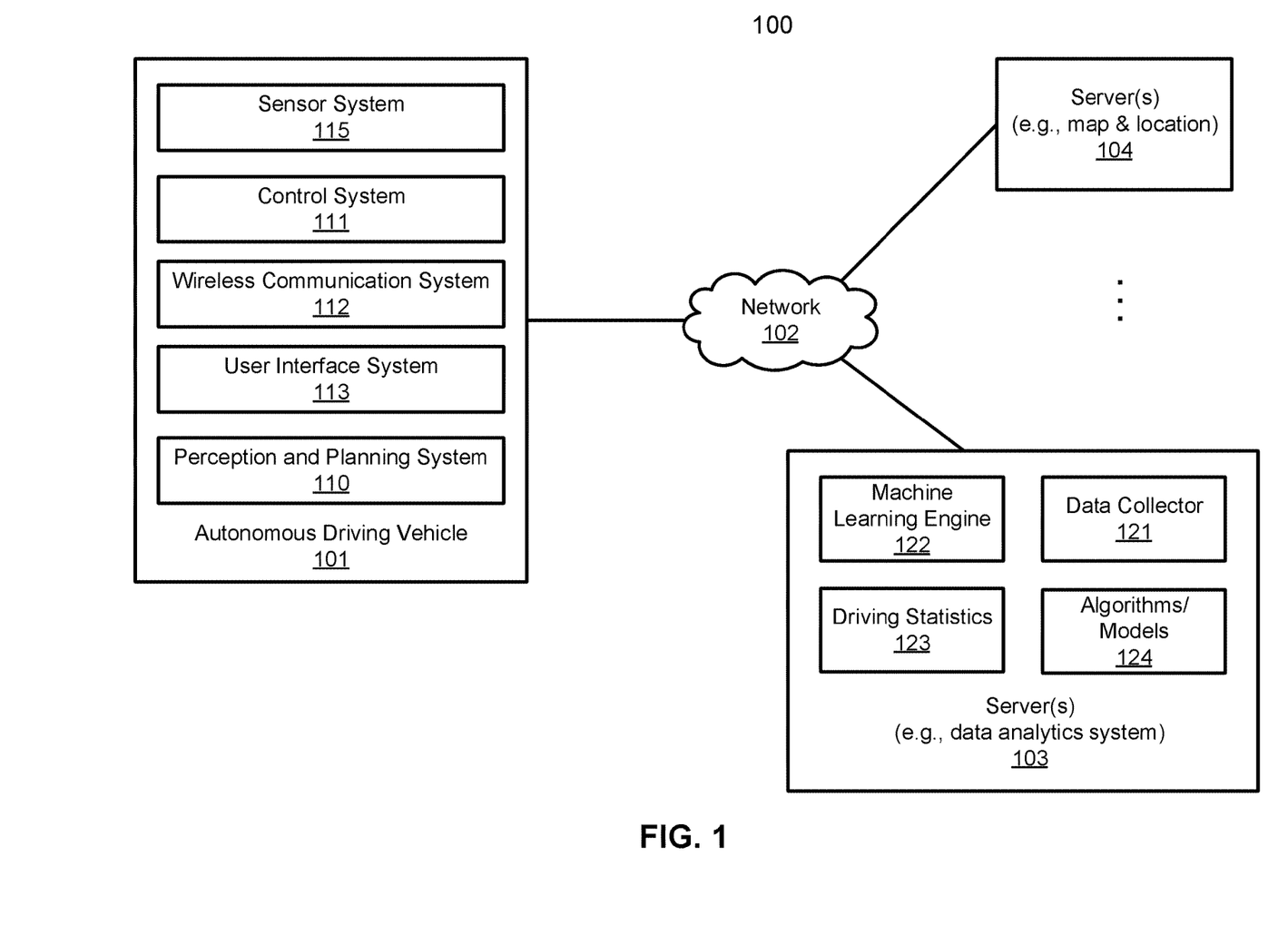
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
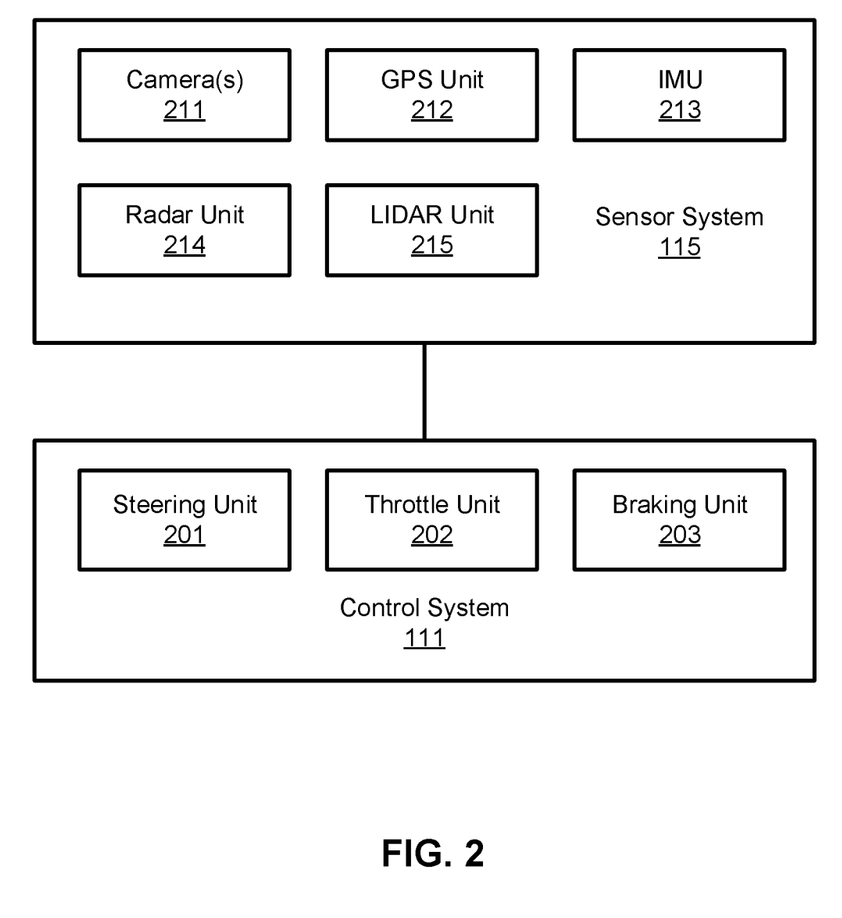
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In some embodiments, any combination of the sensors of the sensor system (e.g., the cameras, scanners, and/or detectors) can gather data used to detect obstacles.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to operating between an open-space mode and an on-lane mode to perform a U-turn. Algorithms 124 can then be uploaded on ADVs to be utilized during autonomous driving in real-time.

Figure 3A:
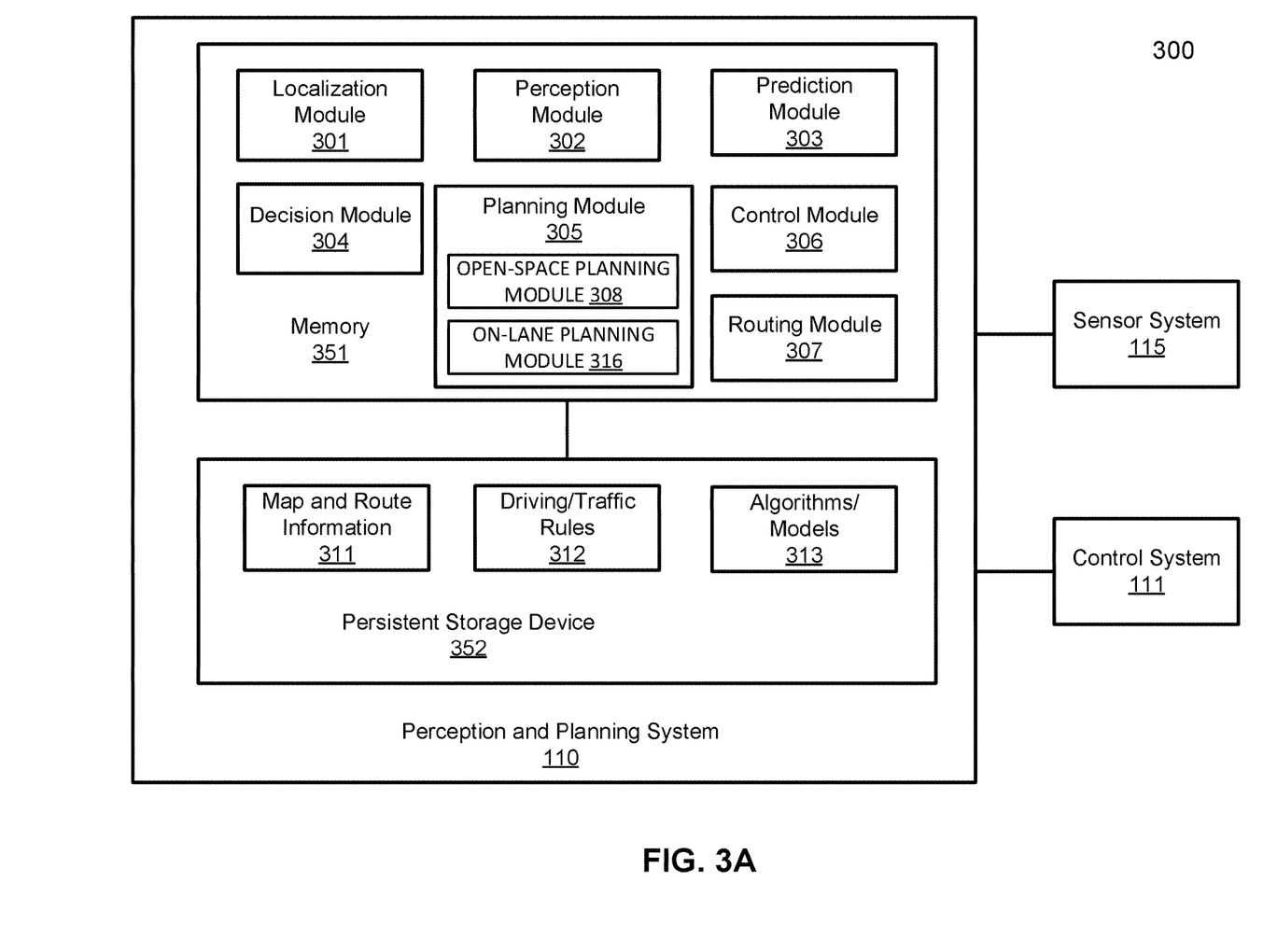
FIGS. 3A-3B are block diagrams illustrating an example of a perception and planning system used with an autonomous vehicle according to one embodiment.
Figure 3B:
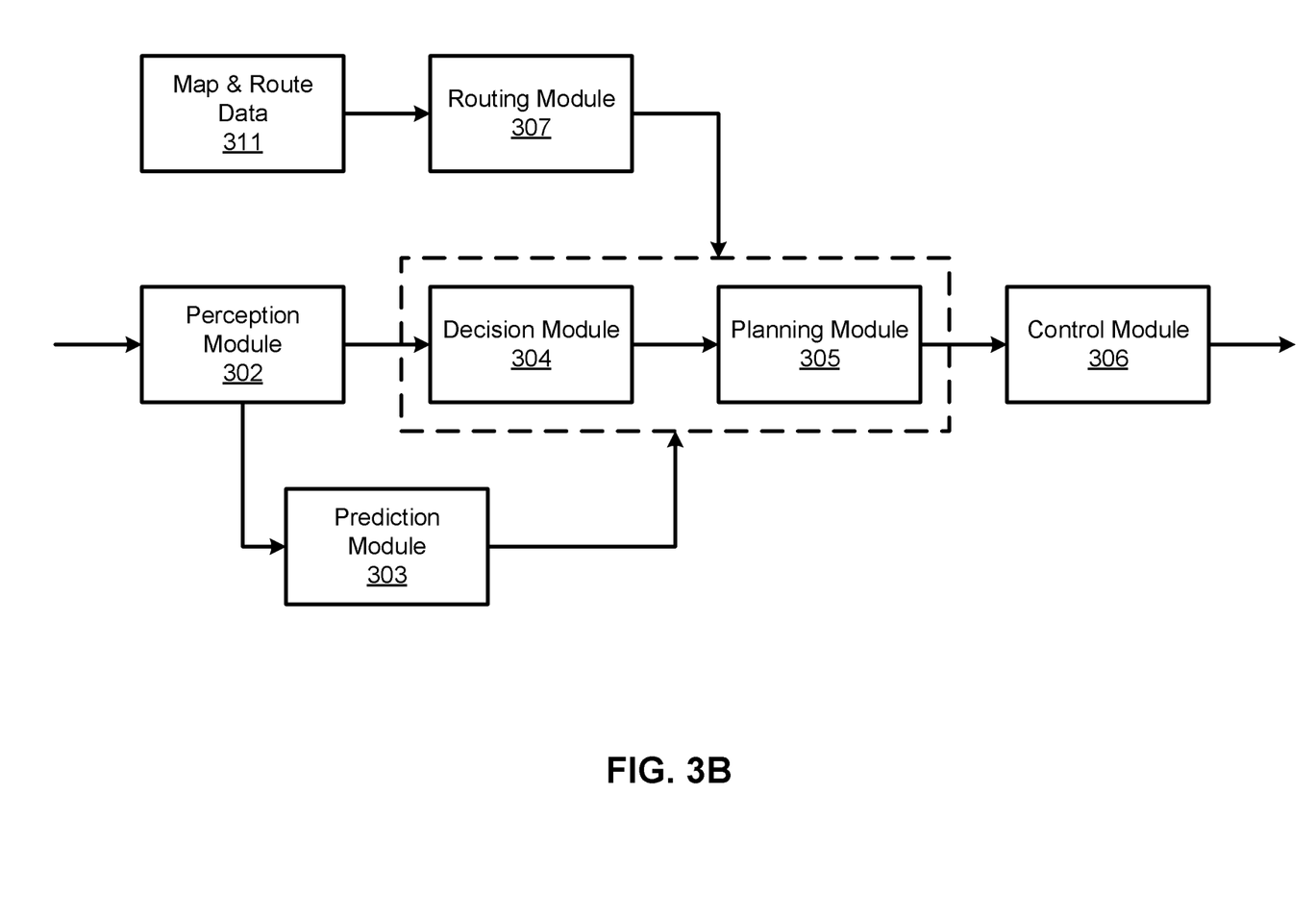

FIG. 3A and FIG. 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or other obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Planning module 305 can include an on-lane planning module 316 and an open-space planning module 308. The on-lane planning module generates the planning and control data of the ADV when the ADV is operating in on-lane mode. The on-lane planning module 316 can have generate controls that limit and restrict the ADV to traveling along a trajectory over a vehicle driving lane. As discussed in other sections, when the ADV determines that it is driving towards a dead-end, the ADV can switch to open-space mode at a determined distance from the dead-end. In this mode, the open-space planning module can generate planning and control data to navigate the ADV out of the dead-end, by performing a three-point turn. When the ADV heading is within a threshold heading and threshold distance relative to the vehicle driving lane, the ADV can switch back to on-lane mode and drive away from the dead-end along the vehicle driving lane.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle. The above autonomous driving process may be referred to as an on-lane autonomous driving.

Figure 4:
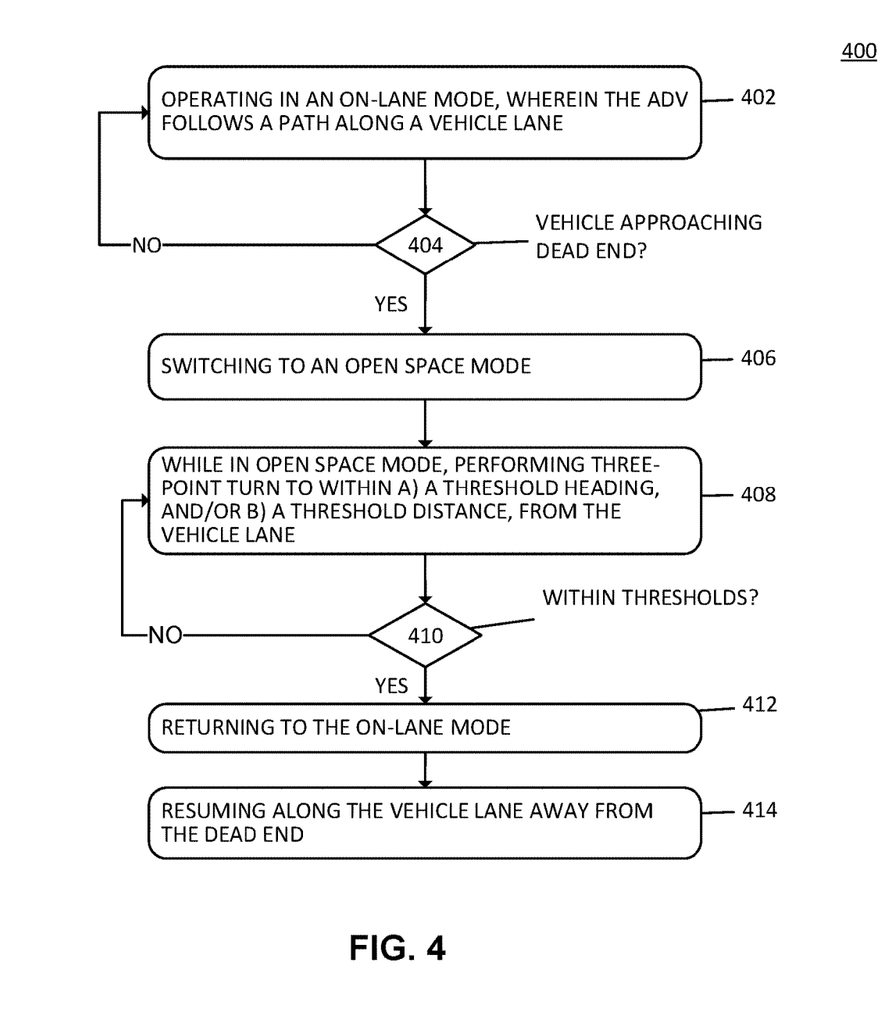
FIG. 4 shows a process for navigating an ADV out of a dead-end, according to one embodiment.

In FIG. 4, a process 400 is shown that can be performed during driving of an autonomous driving vehicle (ADV) to navigate an ADV out of a dead-end or to make a U-turn in a tight space. The process can be performed by one or more processors of the ADV. At block 402, the process includes operating in an on-lane mode. In the on-lane mode, the ADV follows a path or trajectory along a vehicle lane, e.g., following a lane based on lane lines. ADV controls can limit and restrict movement of the ADV so that the ADV travels along a trajectory over the vehicle lane and does not veer off the vehicle lane. A vehicle lane is a designated lane for automobiles to drive, for example, a typical street.

At block 404, the ADV can determine whether the ADV is approaching a dead-end. This determination can be made based on map data. For example, referring briefly to FIG. 3B, map and route data 311 can indicate that the ADV is approaching a dead-end. Additionally or alternatively, sensor data can indicate that the ADV is approaching a dead-end. For example, referring to FIG. 2, sensor system 115 can produce sensor data from GPS Unit 212, LIDAR Unit 215, Radar Unit 214, and/or cameras 211 that indicate that the ADV is approaching a dead-end along the current vehicle driving lane.

In response to determining that the ADV is approaching a dead-end, the process can proceed to block 406. At block 406, the process includes switching to an open-space mode. During the open-space mode, the ADV controls are removed, allowing the ADV to travel freely off the vehicle lane.

At block 408, while in the open-space mode, the process includes performing a three-point turn with a series of forward and backward movements. For example, the three-point turn can be performed by steering the ADV off and away from, the vehicle lane at a turn angle. Next, the ADV can stop and reverse, either straight back (perpendicular to the lane) or at an angle towards the dead-end. When the ADV has reversed sufficiently, the ADV can again drive forward, steering the ADV to within a) a threshold heading, and b) a threshold distance, from the vehicle lane. This is illustrated further in FIG. 5 and FIG. 6, as discussed further below.

At block 410, the ADV can determine whether the ADV is now within a threshold distance of the driving lane. If not, then the ADV can continue to maneuver through a series of control commands such as throttle and steer that move the ADV back and/or forth until the ADV is within a threshold distance and/or threshold heading relative to the driving lane. When the ADV is within the threshold distance and/or threshold heading of the driving lane, the process can proceed to block 408. In this manner, the process does not require aligning the ADV perfectly with the driving lane, but instead requires that the ADV be within a sufficiently close proximity to the driving lane, as defined by the thresholds. To determine whether the ADV is within the thresholds, the ADV can reference sensor data (e.g., cameras, IMU, GPS, etc.) and/or map data to determine the ADV's position and heading relative to the driving lane.

At block 408, in response to the ADV being within the threshold heading and/or the threshold distance from the vehicle lane, the process includes returning to the on-lane mode. At block 410, the ADV can resume movement along the vehicle lane away from the dead-end. The ADV perception and planning system can generate a new route along the vehicle lane to re-route the ADV. In such a manner, the ADV can safely navigate out of a dead-end scenario, while generally maintaining a path on a vehicle driving lane.

Figure 5:
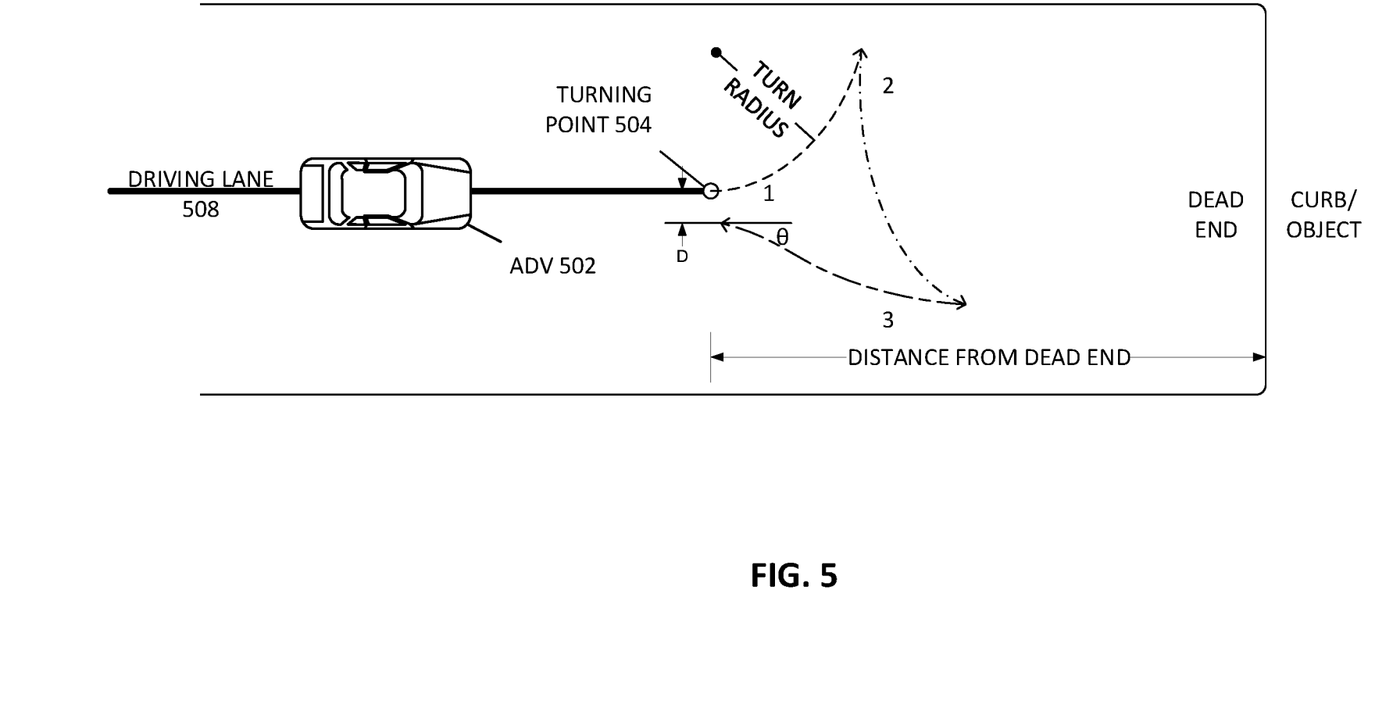
FIG. 5 illustrates an example of an ADV navigating out of a dead-end, according to one embodiment.

FIG. 5 illustrates an example of an ADV navigating out of a dead-end scenario, according to some embodiments. In FIG. 5, ADV 502 is driving along a driving lane 508 in an on-lane mode. During on-lane mode, the ADV's controls restrict movement of the ADV generally to driving along a trajectory over the lane 508. The ADV has determined, based on map data and/or sensor data, that it is moving along the driving lane towards the dead-end.

In response, the ADV can determine a turning point 504 at which the ADV can come to a stop and switch to open-space mode. The ADV can determine a distance between the turning point and the dead-end based on a geometry of the road, obstacles (e.g., parked cars, etc.) and a turning radius of the car (e.g., at the ADV's maximum steering angle away from center).

For example, the larger the turning radius of the ADV at the ADV's maximum steering angle, the greater the distance from the dead-end will be, to allow for the ADV to properly adjust position and heading away from the dead-end in a three-point turn. The smaller the turn radius of the ADV, the closer the ADV can get to the dead-end before starting the turn.

Similarly, the wider the road is, the more space the ADV will have to drive in larger arcs. Thus, for wider roads, the distance between the turning point and the dead-end can be increased to allow the ADV to perform a three-point turn with a wider turn, thus providing a smoother driving experience. A determination of the distance from the dead-end is application specific and can be determined through known geometrical calculations. In one embodiment, the distance from the dead-end is greater than or equal to the ADV's turn radius at a maximum steering angle. In another embodiment, the distance from the dead-end is greater than the ADV's turn radius, to provide additional safety and reduce risk of collision. A dead-end boundary can be determined by a curb location, a wall, or other physical obstruction that could come in contact with the vehicle.

After the turning point has been determined, the ADV can proceed along the driving lane 508 until it reaches the turning point. At the turning point, the ADV can come to a stop (e.g., by braking). The ADV can switch to open-space mode. While in open-space mode, the ADV perform a three-point turn to within a threshold heading and within a threshold distance relative to the vehicle driving lane.

For example, the ADV can, while driving forward, steer off-of and away from the vehicle lane at a turn angle such as, for example, a maximum steering angle turned right or left of center. This is part '1' of the three-point turn. When the ADV travels sufficiently far (to provide room for reversing), the ADV can stop and reverse, either straight back (perpendicular to the lane) or at an angle towards the dead-end. This is part '2' of the three-point turn. When the ADV has reversed sufficiently, the ADV can stop and drive forward towards the driving lane. This is part '3' of the three-point turn. The ADV can steer to within a) a threshold heading (shown as an angle θ, between the ADV heading and the driving lane), and/or b) a threshold distance (shown as distance 'D' between the ADV and the driving lane), from the vehicle lane.

The thresholds can be determined through routine test and experimentation, which may also depend on the physical dimension and/or turning radius of the vehicle. For example, in some embodiments, if the ADV heading is within 25° or less of the driving lane, then the threshold is satisfied. In other embodiments, the heading threshold is 10° or 5°. In some embodiments, the distance threshold is 2 meters, 1 meter, or half a meter.

In some embodiments, if the road is too narrow, then the ADV may have to drive forward and back, each time adjusting the ADV heading until the ADV is able to drive forward away from the dead-end. Thus, the ADV can generate additional controls, while in open-space mode, if a traditional three-point turn is not possible, to turn the ADV around and navigate out of the dead-end.

It should be understood that, a vehicle lane can be formed from a two-way lane that allows traffic in both directions. For example, referring to FIG. 6, a vehicle driving lane can include a first lane 608 that leads toward the dead-end and a second lane 610, alongside (and parallel to) the first lane, that leads away from the dead-end. In some cases, the first lane and the second lane can be separated by lane markings, but not necessarily.

Figure 6:
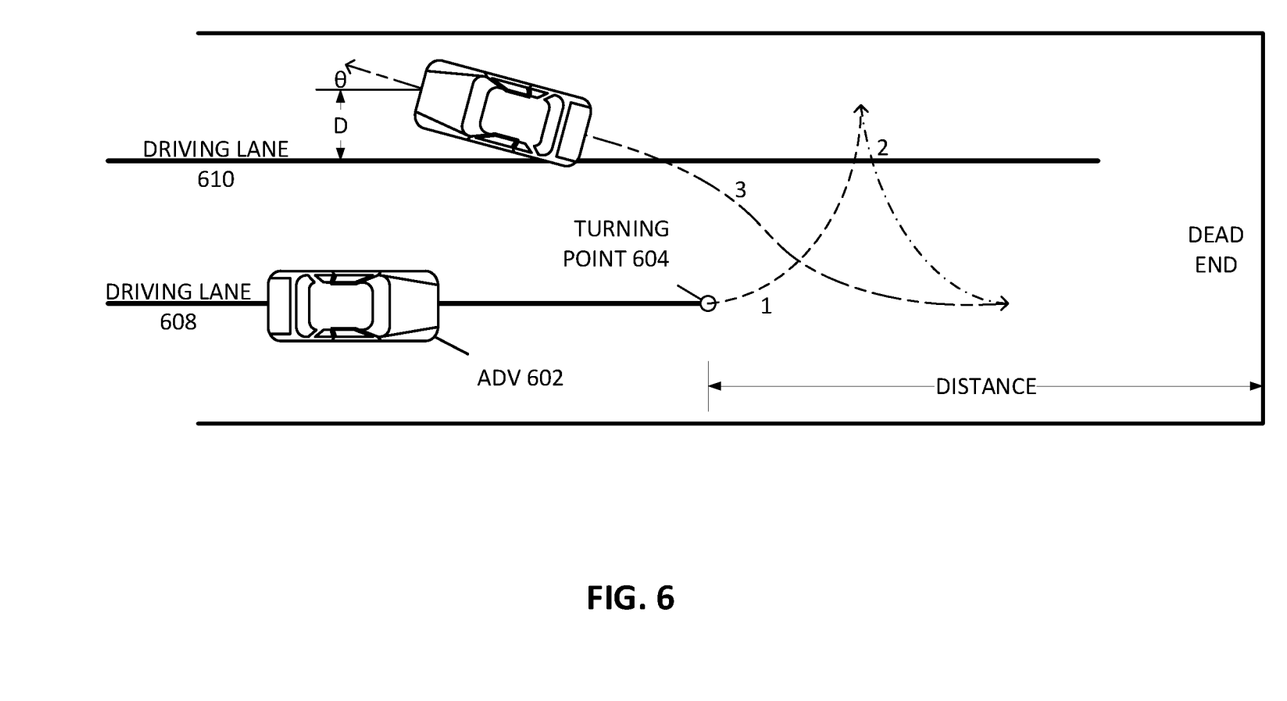
FIG. 6 illustrates an example of an ADV navigating out of a dead-end, according to one embodiment.

ADV 602 can drive along driving lane 608 while in on-lane mode. When the ADV determines that it is driving towards a dead-end, the ADV can determine a turning point 604 at a sufficient distance away from the dead-end. The ADV can conduct a three-point turn to within a threshold heading and threshold distance relative to the driving lane 610. The ADV can the return to on-lane mode and drive along driving lane 610, away from the dead-end. Note that the above techniques can also be applied to any U-turn situation, particularly in a tight turning space.

Figure 7:
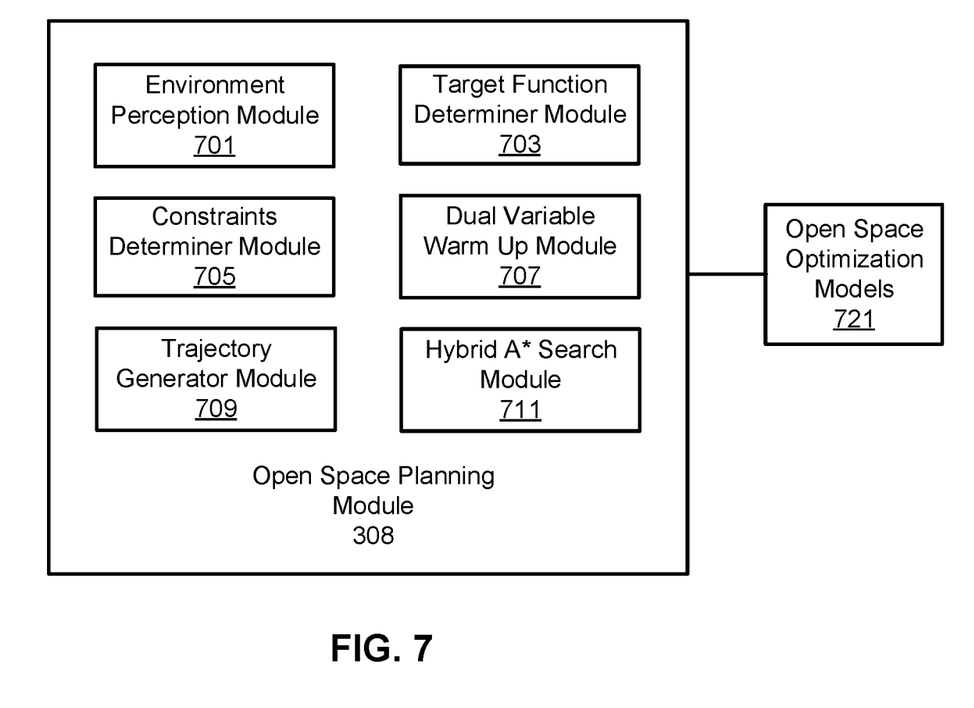
FIG. 7 illustrates an example of an open-space planning module, according to one embodiment.

Referring to FIG. 7, in one embodiment, open space planning module includes environment perception module 701, target function determiner module 703, constraints determiner module 705, dual variable warming up module 707, trajectory generator module 709, and hybrid A* search module 711. Environment perception module 701 can perceives an environment of the ADV. Target function determiner module 703 can determine a target function for an optimization model (e.g., open space optimization model 721 (as part of models 313 of FIG. 3A)) to optimize. Constraints determiner module 705 can determine constraints for the optimization model. Constraints can include inequality, equality, and bound constraints. Dual variable warming up module 707 can apply a quadratic programming (QP) solver to a target (objective) function to solve for one or more variables (such as dual/two variables) subject to some constraints, where the target function is a quadratic function. Trajectory generator module 709 can generate a trajectory based on the solved variables. Hybrid A* search module 711 can search for an initial trajectory (zig zag, non-smooth trajectory without consideration for observed obstacles) using a search algorithm, such as an A* search algorithm, or a hybrid A* search algorithm.

Figure 8:
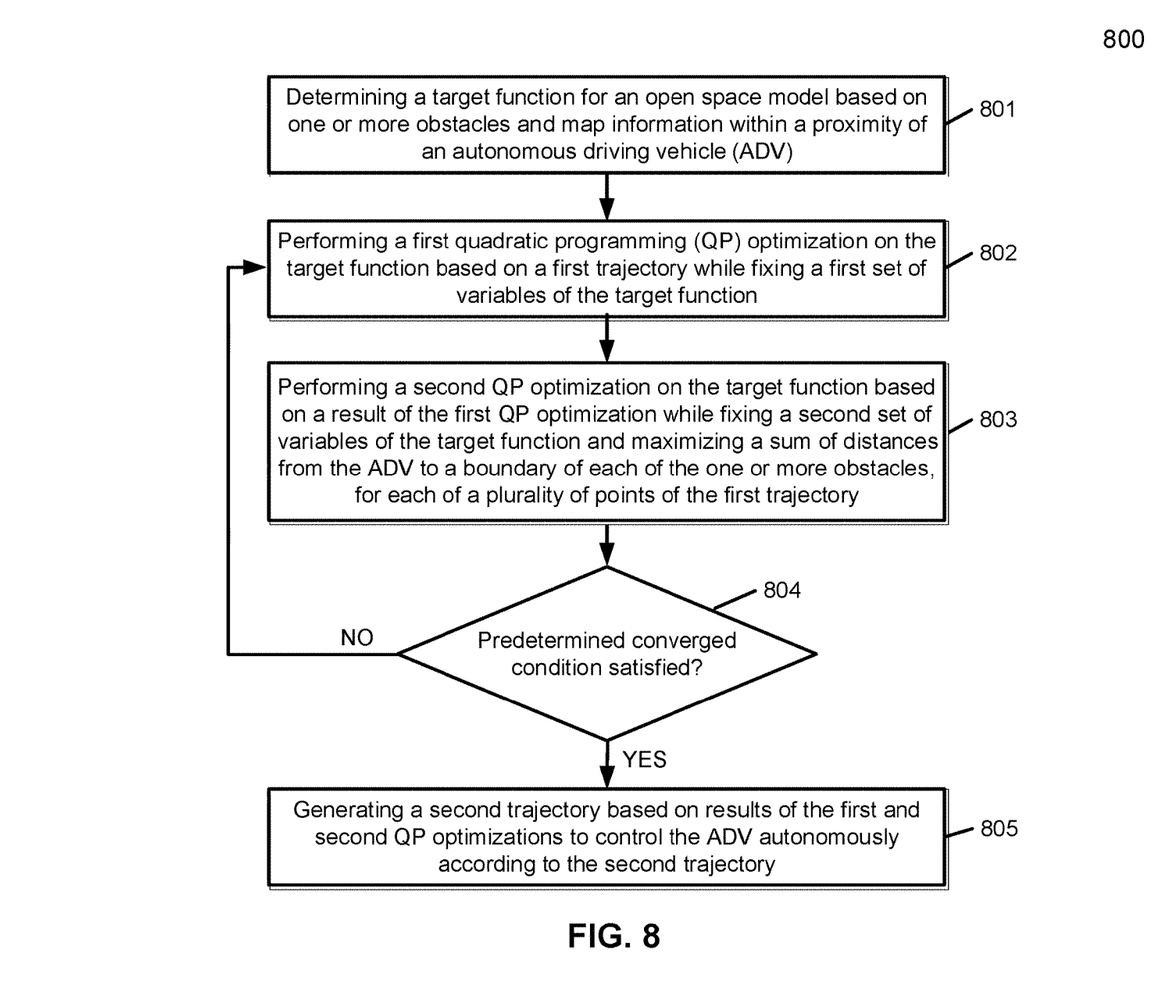
FIG. 8 shows work flow for the open-space planning module according to one embodiment.

FIG. 8 is a flowchart illustrating an example of a work flow for the open space planning module for an ADV according to one embodiment. Referring FIG. 8, in operation 801, processing logic extracts environment constraints from HD map, and moving obstacles constraints from prediction module, e.g. prediction module 303, to generate the open space optimization algorithm, and initializes matrices/vectors for the constraints of the optimization algorithm. In one embodiment, the optimization model can be previously generated and uploaded on the ADV (e.g., model 721 of FIG. 7, as part of models 313 of FIG. 3A). Constraints can include distances from the vehicle to the open road boundaries, dimensions of accessible roadways, road curbs, and one or more obstacles. The obstacles can include moving obstacles such as cars and moving pedestrians, and non-moving obstacles such as buildings, blockades, and fences. The moving obstacles can be processed by the prediction module to determine the predicted locations for the moving obstacles at some later point in time. These obstacles and constraints can be modeled into matrices and vectors for an optimization algorithm.

An example of an optimization algorithm for a controlled object and obstacles can be given as:

$$\mathcal{J}(x, u, d) = \sum_{k=0}^{K} l(x(k), u(k)) + \alpha \|x(k) - x_F\|_2^2 + \beta \sum_{m=0}^{M} \sum_{k=0}^{K} d_m(k)$$

wherein:
(1) $\mathcal{J}$ is a cost function based upon the autonomous driving vehicle (ADV) state variable x, ADV control variable u, and a collection d of distances from the ADV to each object in a collection of M obstacles, (2) $\Sigma_{k=0}^{k} l(x(k), u(k))$ is a cost function that is used to smooth trajectory and save control energy.

(3) x(k) is a trajectory for a discretized time step k, (4) u(k) is represents control inputs to the ADV at time step k, (5) α>0 represents a hyper-parameter to minimize the final state's position to the target $x_F$, (6) $\alpha \|x(k)-x_F\|_2^2$ is a penalty for the deviation between the $k^{th}$ location and heading of the ADV at time k,x(k), and the final location and heading, $x_F$, of the ADV, tuned by constant, α, (7) β>0 is a hyper-parameter to maximize the total safety distances between the ADV and the M obstacles and other boundaries, and (8)

$$\beta \sum_{m=0}^{M} \sum_{k=0}^{K} d_m(k)$$

is a collision-avoidance buffer-zone aware $d_m(k)$, added to the original target function.

The above open space target function for the trajectory of the ADV is subject to:

(1) x(0)=$x_0$, wherein $x_0$ is an initial state of the ADV at time increment k=0, (2) x(k+1)=f (x(k), u(k)), wherein f is a vehicle dynamic model, such as a bicycle model of a vehicle, (3) h(x(k), u(k))≤0, wherein h is a function that includes limitations of the ADV, such as maximum heading ratio, velocity, and acceleration of the vehicle.

(4) $-g^T \mu_m (k)+(A_m t(x(k))-b_m)^T \lambda_m(k)+d_m(k)>0$, wherein matrix A and vector b relates to sizes and locations of one or more obstacles surrounding the vehicle, (5) $G^T \mu_m(k)+R(x(k))^T A_m^T \lambda_m(k)=0$, wherein $g^T$ and $G^T$ relate to a size and location of the ADV, respectively. λ and μ describe dual variables representing distances between obstacles and the vehicle, and R is a rotation matrix, measuring a rotation of the ADV relative to the M obstacles, based on a reference direction of the ADV. Some variables may not be initialized without an initial trajectory, e.g., R is not defined without an initial trajectory. Matrix A and vector b relate to sizes and locations of one or more obstacles surrounding the ADV. The obstacles can be modeled as, e.g., polygons.

(6) $\|A_m^T \lambda_m(k)\|_2 \leq 1$, wherein matrix $A_m$ represents the $m^{th}$ polygon of a set of obstacles, (7) $\lambda_m(k) \geq 0$, $\mu_m(k) \geq 0$, wherein $\lambda_m(k)$ and $\mu_m(k)$ are dual variables representing distances between the $m^{th}$ polygon of a set of obstacles and the ADV at time step k of the trajectory, (8) $d_m(k) \leq 0$, describes the safety distance between the vehicle and the $m^{th}$ obstacle polygon at time step k, for k=0, . . . K ,m=1, . . . , M, and d is the notation of their collection.

In operation 802, open space planning module 308 can perform a first quadratic programming (QP) optimization on the target function on a first trajectory, while fixing a first set of variables of the target function. In an embodiment, the first set of variables can include the dual variables, λ and μ representing distances between polygons of sets of obstacles and the ADV over time increments k=0 . . . K. In an embodiment, the first trajectory can be obtained by a Hybrid A* search.

In operation 803, open space planning module 308 can perform a second QP optimization on the target function while fixing a second set of variables and maximizing a sum of distances away from the ADV to a boundary of each of the one or more obstacles over each of a plurality of points of the first trajectory. The distance of the ADV away from any polygon m of a set of obstacles at time step k can be expressed as a negative number, such that the optimization seeks to maximize the distance (i.e., the magnitude of the negative distances) of the ADV away from each polygon m of a set of obstacles for all time steps k=0 . . . K of the first trajectory by optimizing the sum:

$$\beta \sum_{m=0}^{M} \sum_{k=0}^{K} d_m(k)$$

In operation 804, it can be determined whether the optimization of the open space model target function converges to a predetermined condition. If so, then method 800 continues at operation 805, otherwise method 800 continues at operation 802.

In operation 805, open space planning module 808 can generate a second trajectory based on the results of the first and second QP optimizations. The ADV can then be controlled autonomously according to the second trajectory.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV) the method comprising:
   operating in an on-lane mode, including
      determining lane configuration associated with a current lane based on lane marking, and
      planning a trajectory based on the lane configuration; and
   in response to a request for a U-turn, switching to an open-space mode, while operating in the open-space mode,
      performing a three-point turn to generate forward and reverse movements of the ADV to position the ADV within a threshold heading and a threshold distance relative to a target lane, and
      in response to the ADV being positioned within the threshold heading and the threshold distance relative to the target lane, returning to the on-lane mode for the ADV to complete the U-turn.

2. The method of claim 1, further comprising, while operating the on-lane mode, in response to determining that the ADV is approaching a dead-end, controlling the ADV to stop and switch to the open-space mode at a predetermined distance from the dead-end.

3. The method of claim 2, wherein the predetermined distance from the dead-end at which the ADV stops is determined based on a turning radius of the ADV at a maximum steering angle.

4. The method of claim 2, further comprising determining that the ADV is approaching the dead-end based on map data and sensor data obtained from a plurality of sensors mounted on the ADV.

5. The method of claim 2, wherein the current lane leads toward the dead-end and the target lane leads away from the dead-end, and wherein the current lane and the target lane are separated by a lane line.

6. The method of claim 1, wherein during the on-lane mode, ADV controls limit the ADV to traveling along a trajectory over the current lane.

7. The method of claim 6, wherein during the open-space mode, the ADV controls are removed, allowing the ADV to travel freely off the current lane.

8. The method of claim 1, wherein if a road on which the vehicle lane is located does not have sufficient clearance for the three-point turn, the ADV generates further controls to move the ADV backwards and forwards while adjusting the heading of the ADV until the ADV is within the threshold heading and the threshold distance relative to the target lane.

9. A non-transitory machine-readable medium having instructions stored therein, which when executed by a processor, cause the processor to perform operations of operating an autonomous driving vehicle (ADV) the operations comprising:
   operating in an on-lane mode, including
      determining lane configuration associated with a current lane based on lane marking, and
      planning a trajectory based on the lane configuration; and
   in response to a request for a U-turn, switching to an open-space mode, while operating in the open-space mode,
      performing a three-point turn to generate forward and reverse movements of the ADV to position the ADV within a threshold heading and a threshold distance relative to a target lane, and
      in response to the ADV being positioned within the threshold heading and the threshold distance relative to the target lane, returning to the on-lane mode for the ADV to complete the U-turn.

10. The machine-readable medium of claim 9, wherein the operations further comprise, while operating the on-lane mode, in response to determining that the ADV is approaching a dead-end, controlling the ADV to stop and switch to the open-space mode at a predetermined distance from the dead-end.

11. The machine-readable medium of claim 10, wherein the predetermined distance from the dead-end at which the ADV stops is determined based on a turning radius of the ADV at a maximum steering angle.

12. The machine-readable medium of claim 10, wherein the operations further comprise determining that the ADV is approaching the dead-end based on map data and sensor data obtained from a plurality of sensors mounted on the ADV.

13. The machine-readable medium of claim 10, wherein the current lane leads toward the dead-end and the target lane leads away from the dead-end, and wherein the current lane and the target lane are separated by a lane line.

14. The machine-readable medium of claim 9, wherein during the on-lane mode, ADV controls limit the ADV to traveling along a trajectory over the current lane.

15. The machine-readable medium of claim 14, wherein during the open-space mode, the ADV controls are removed, allowing the ADV to travel freely off the current lane.

16. The machine-readable medium of claim 9, wherein if a road on which the vehicle lane is located does not have sufficient clearance for the three-point turn, the ADV generates further controls to move the ADV backwards and forwards while adjusting the heading of the ADV until the ADV is within the threshold heading and the threshold distance relative to the target lane.

17. A data processing system, comprising:
a processor; and
a memory coupled to the processor to store instructions, which when executed by the processor, cause the processor to perform operations of operating an autonomous driving vehicle, the operations comprising
operating in an on-lane mode, including
determining lane configuration associated with a current lane based on lane marking, and
planning a trajectory based on the lane configuration; and
in response to a request for a U-turn, switching to an open-space mode, while operating in the open-space mode,
performing a three-point turn to generate forward and reverse movements of the ADV to position the ADV within a threshold heading and a threshold distance relative to a target lane, and
in response to the ADV being positioned within the threshold heading and the threshold distance relative to the target lane, returning to the on-lane mode for the ADV to complete the U-turn.

18. The system of claim 17, wherein the operations further comprise, while operating the on-lane mode, in response to determining that the ADV is approaching a dead-end, controlling the ADV to stop and switch to the open-space mode at a predetermined distance from the dead-end.

19. The system of claim 18, wherein the predetermined distance from the dead-end at which the ADV stops is determined based on a turning radius of the ADV at a maximum steering angle.

20. The system of claim 18, wherein the operations further comprise determining that the ADV is approaching the dead-end based on map data and sensor data obtained from a plurality of sensors mounted on the ADV.

* * * * *